(12) United States Patent
Kim et al.

(10) Patent No.: US 7,445,872 B2
(45) Date of Patent: *Nov. 4, 2008

(54) ORGANIC ELECTROLYTIC SOLUTION AND LITHIUM BATTERY USING THE SAME

(75) Inventors: Ju-yup Kim, Seoul (KR); Myung-dong Cho, Kyungki-do (KR); Young-gyoon Ryu, Kyungki-do (KR)

(73) Assignee: Samsung SDI Co., Ltd., Suwon, Kyungki-Do (KR)

( * ) Notice: Subject to any disclaimer, the term of this patent is extended or adjusted under 35 U.S.C. 154(b) by 518 days.

This patent is subject to a terminal disclaimer.

(21) Appl. No.: 10/601,907

(22) Filed: Jun. 24, 2003

(65) Prior Publication Data

US 2004/0096749 A1    May 20, 2004

(30) Foreign Application Priority Data

Nov. 15, 2002    (KR) .................. 10-2002-0071043

(51) Int. Cl.
*H01M 6/16*    (2006.01)
*H01M 4/58*    (2006.01)

(52) U.S. Cl. .................. 429/324; 429/231.95

(58) Field of Classification Search .......... 429/324, 429/218.1, 231.95, 334

See application file for complete search history.

(56) References Cited

U.S. PATENT DOCUMENTS

| | | | |
|---|---|---|---|
| 4,737,424 A | 4/1988 | Tobishima et al. |
| 5,352,548 A | 10/1994 | Fujimoto et al. |
| 5,626,981 A | 5/1997 | Simon et al. |
| 5,695,887 A | 12/1997 | Amatucci et al. |
| 5,712,059 A | 1/1998 | Barker et al. |
| 5,714,281 A | 2/1998 | Naruse et al. |
| 5,961,672 A | 10/1999 | Skotheim et al. |
| 6,017,651 A | 1/2000 | Nimon et al. |
| 6,025,094 A | 2/2000 | Visco et al. |
| 6,030,720 A | 2/2000 | Chu et al. |
| 6,045,950 A | 4/2000 | Chang |
| 6,048,637 A | 4/2000 | Tsukahara |
| 6,114,070 A | 9/2000 | Yoshida et al. |
| 6,291,107 B1 | 9/2001 | Shimizu |
| 6,919,143 B2 | 7/2005 | Hwang et al. |

2002/0102466 A1    8/2002    Hwang et al.

FOREIGN PATENT DOCUMENTS

| | | | |
|---|---|---|---|
| CN | 1335653 A | | 2/2002 |
| JP | 62-219475 A | | 9/1987 |
| JP | 1-265454 | * | 10/1989 |
| JP | 07-211350 A | | 8/1995 |
| JP | 8321311 A2 | | 12/1996 |
| JP | 9-199172 | | 7/1997 |
| JP | 9-199172 A | | 7/1997 |
| JP | 11-026016 A | | 1/1999 |
| JP | 2002-075447 A | | 3/2002 |
| JP | 2002-110237 A | | 4/2002 |

OTHER PUBLICATIONS

Notice To Submit Response, issued by the Korean Industrial Property Office on May 25, 2004, Application No. 10-2002-0071043.
European Search Report dated May 27, 2005 for European Application 03 254 063.5.
Database Chemabs [Online] Chemical Abstracts Service, Columbus, Ohio, US; Jinno, Maruo et al: "Nonaqueous electrolyte batteries having reactive additives in electrolytes" XP002265833 retrieved from STN Database accession No. 126:106586 and concerning JP8321311 Automatic translation by the Japanese Patent of JP08321311 Office into the English language.
Chinese Office Action dated May 27, 2004 and English Translation.

* cited by examiner

*Primary Examiner*—Patrick Ryan
*Assistant Examiner*—Julian Mercado
(74) *Attorney, Agent, or Firm*—Buchanan Ingersoll & Rooney PC

(57) ABSTRACT

An organic electrolytic solution containing a lithium salt, an organic solvent, and an oxalate compound, and a lithium battery using the organic electrolytic solution are provided. Due to the oxalate compound, the organic electrolytic solution stabilizes lithium metal and improves the conductivity of lithium ions. Also, the organic electrolytic solution present invention improves charging/discharging efficiency when used in lithium batteries having a lithium metal anode. Especially when the organic electrolytic solution is used in lithium sulfur batteries, the oxalate compound forms a chelate with lithium ions and improves the ionic conductivity and the charging/discharging efficiency of the battery. In addition, due to the chelation of the lithium ions, negative sulfur ions remain free without interaction with lithium ions, are highly likely to dissolve in an electrolytic solution. As a result, a reversible capacity of sulfur is improved.

19 Claims, 7 Drawing Sheets

ORGANIC ELECTROLYTIC SOLUTION AND LITHIUM BATTERY USING THE SAME

BACKGROUND OF THE INVENTION

This application claims priority from Korean Patent Application No. 2002-71043, filed on Nov. 15, 2002, in the Korean Intellectual Property Office, the disclosure of which is incorporated herein in its entirety by reference.

1. Field of the Invention

The present invention relates to an organic electrolytic solution and a lithium battery containing the same, and more particularly, to an organic electrolytic solution capable of stabilizing lithium metal and improving lithium ionic conductivity, and a lithium battery containing the organic electrolytic solution.

2. Description of the Related Art

With the rapid advance of compact portable electronic devices, there is an increasing need for batteries having high energy densities for miniature portable electronic devices.

Lithium sulfur batteries are known as the most promising types of batteries that are capable of satisfying the above requirement over other batteries developed by far due to their high energy density. Lithium and sulfur ($S_8$) used as active materials in the manufacture of lithium sulfur batteries have an energy density of about 3,830 mAh/g and 1,675 mAh/g, respectively, and are known as being economical and environmentally friendly. However, there has been no successful commercial use of these active materials in battery systems. The reason why it has been difficult to commercialize lithium sulfur batteries lies in the low availability of sulfur as an active material in electrochemical oxidation reactions, which finally leads to low battery capacitance. In addition, the lifespan of batteries can be shortened due to the outflow of sulfur to electrolyte during oxidation and reduction reactions. If an unsuitable electrolytic solution is used, sulfur is reduced and separated as lithium sulfide ($Li_2S$) that is no longer available in electrochemical reactions.

To resolve these problems, many attempts have been made to optimize the composition of the electrolytic solution. As an example, U.S. Pat. No. 6,030,720 discloses use of a mixture of a main solvent such as tetraglyme and a donor solvent having 15 or greater donor number, such as n,n-diethylacetamide, as an organic solvent of an organic electrolyte.

U.S. Pat. No. 5,961,672 discloses use of an organic electrolytic solution of 1 M $LiSO_3CF_3$ in a mixed solvent of 1,3-dioxolane, diglyme, sulfolane, and diethoxyethane for improved lifespan and safety measures of batteries, wherein a lithium metal anode is coated with a polymeric film.

When a lithium metal electrode is used as an anode of a lithium secondary battery, the lifespan, capacitance, and other properties of the battery degrade compared to using a carbonaceous or graphite electrode. In particular, as a result of repeated charging/discharging cycles, dendrites are separated and grow on the surface of the lithium metal anode, and contact the surface of a cathode, thereby causing shorting out. In addition, the lithium metal corrodes as a result of a reaction with an electrolytic solution at the surface of the lithium anode.

As a solution to these problems, a method of forming a protecting layer on the surface of the lithium metal electrode has been suggested (U.S. Pat. Nos. 6,017,651, 6,025,094, and 5,961,672). To be effective, the protecting layer formed on the surface of the lithium electrode should allow lithium ions to pass through itself as well as act as a barrier to prevent an electrolytic solution from contacting the lithium metal of the anode.

In general, this lithium-protecting layer is formed by the reaction of lithium and a protective layer-forming additive contained in the electrolytic solution after the assembly of the battery. However, the protecting layer formed by this method has poor density, so that a considerable amount of electrolytic solution permeates through pores present in the protective layer and undesirably react with lithium metal.

Another method of forming a lithium-protecting layer involves processing the surface of a lithium electrode with nitrogen plasma to form a lithium nitride ($Li_3N$) layer on the electrode. However, the lithium nitride layer formed by this method includes grain boundaries through which the electrolytic solution easily permeates, is highly likely to decompose when in contact with water, and has a low potential window. Therefore, the lithium nitride layer is impractical to use.

SUMMARY OF THE INVENTION

The present invention provides an organic electrolytic solution that stabilizes, lithium metal due to reduction in reactivity with lithium metal and improves the conductivity of lithium ions.

The present invention also provides a lithium battery providing improved charging/discharging efficiency by using the organic electrolytic solution.

In accordance with an aspect of the present invention, there is provided an organic electrolytic solution comprising: a lithium salt; an organic solvent; and an oxalate compound of formula (1) below:

(1)

where $R_1$ and $R_2$ are independently selected from hydrogen atom, halogen atom, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ arylalkyl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroarylalkyl group, a substituted or unsubstituted $C_2$-$C_{30}$ heteroaryloxy group, a substituted or unsubstituted $C_5$-$C_{20}$ cycloalkyl group, and a substituted or unsubstituted $C_2$-$C_{20}$ heterocycloalkyl group.

In accordance with another aspect of the present invention, there is provided a lithium battery comprising: a cathode; an anode; a separator interposed between the cathode and the anode; and the above-described organic electrolytic solution.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an organic electrolytic solution and a lithium battery using the organic electrolytic solution according to the present invention will be described in detail.

In general, the charging/discharging behaviour of lithium batteries is greatly affected by the properties of a thin film formed on the surface of an electrode. The formation of dendrites on the surface of the lithium anode during charging/discharging cycles causes shorting out of the battery and adversely affects the battery lifespan.

As a lithium battery is charged, a solid electrolyte interface (SEI) is formed on the surface of its anode as a result of decomposition of the electrolytic solution contained therein. This SEI effectively suppresses side reactions occurring at the anode surface and improves the battery lifespan. However, with repeated charging/discharging cycles of the battery, even the SEI degrades and the electrolytic solution decomposes more and more at the surface of the anode. Accordingly, in the present invention, an organic electrolytic solution for lithium batteries is prepared by adding an oxalate compound of formula (1) below that is chelatable with lithium ions. The organic electrolytic solution according to the present invention has reduced reactivity to lithium and improved ionic conductivity due to the chelation of lithium ions with the oxalate compound of formula (1) below. Therefore, the organic electrolytic solution according to the present invention can improve charging/discharging efficiency when used in lithium batteries.

When an organic electrolytic solution according to the present invention containing an oxalate compound of formula (1) below is used, especially in a lithium sulfur battery, bonding between lithium ions and sulfide anions is blocked, so that the solubility of sulfide is improved. As a result, a reversible capacity of sulfur is increased.

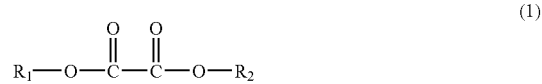

where $R_1$ and $R_2$ are independently selected from hydrogen atom, halogen atom, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ arylalkyl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroarylalkyl group?, a substituted or unsubstituted $C_2$-$C_{30}$ heteroaryloxy group, a substituted or unsubstituted $C_5$-$C_{20}$ cycloalkyl group, and a substituted or unsubstituted $C_2$-$C_{20}$ heterocycloalkyl group.

The principles of the present invention will be described with reference to FIGS. 1A and 1B, which illustrate the interaction between dimethyl oxalate as an example of an oxalate compound of formula (1) above and lithium.

Figure 1A:
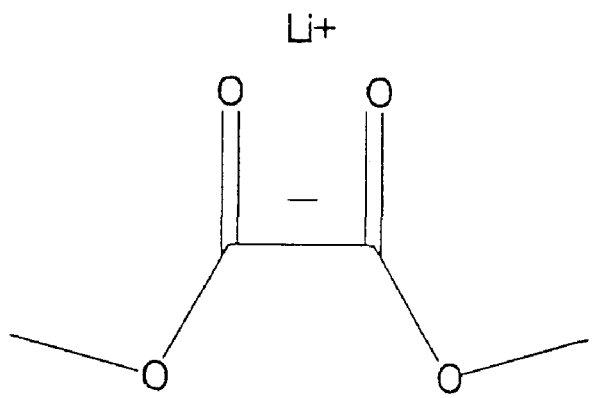
FIGS. 1A and 1B illustrate the interaction between lithium ions and dimethyl oxalate as an example of an oxalate compound of formula (1) above according to the present invention.

Referring to FIG. 1A, in an oxalate compound of formula (1) above, two carbon-oxygen double (C=O) bonds are present in the middle portion. Accordingly, when positive lithium ions are present around the oxalate compound of formula (1) above, localized negative charges appear between the two carbon-oxygen double bonds. Lithium ions are attracted close to the localized negative charges in the oxalate compound to form a chelate compound, as illustrated in FIG. 1B. As a result, negative sulfide ions produced by the reduction of sulfur are unlikely to bond to lithium ions, remain stable in the electrolytic solution. As a result, a reversible capacity of sulfur is increased. If lithium ions exist unbound, the free lithium ions form lithium sulfide with negative sulfide ions that is no longer available for electrochemical reactions in charging batteries.

Figure 1B:
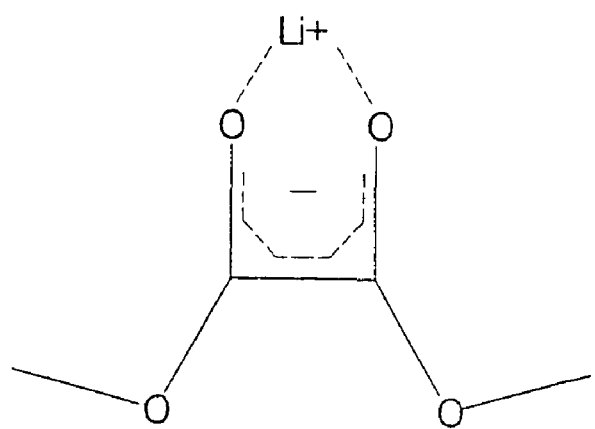

The chelate compound illustrated in FIG. 1B migrates toward the lithium anode during charging and stays in the SEI formed on the surface of the lithium anode. The lithium ions of the chelate compound increase the conductivity of lithium ions in the SEL and stabilize the SEI.

Specified examples of an oxalate compound of formula (1) above include diethyl oxalate, dimethyl oxalate, dipropyl oxalate, dibutyl oxalate, bis-(4-methylbenzyl) oxalate, etc.

The amount of the oxalate compound of formula (1) above is in a range of 0.001-10 parts by weight, preferably 0.05-1 parts by weight, with respect to 100 parts by weight of an organic solvent of the organic electrolytic solution. If the amount of the oxalate compound of formula (1) above is less than 0.001 parts by weight, the effect of the additive is trivial. If the amount of the oxalate compound of formula (1) above exceeds 10 parts by weight, the lifespan properties of batteries degrade.

An organic solvent of an organic electrolytic solution according to the present invention is at least one selected from polyglymes of formula (2) below, dioxolanes, carbonates, 2-fluorobenzene, 3-fluorobenzene, dimethoxyethane (DME), diethoxyethane, and sulfolane (SUL).

where m is an integer from 1 to 10, and $R^3$ and $R^4$ are independently substituted or unsubstitued $C_1$-$C_{20}$ alkyl groups.

Specified examples of polyglymes of formula (2) above include diglyme (DGM, also called "diethyleneglycol dimethylether"), diethyleneglycol diethylether, triglyme (TGM, also called "triethyleneglycol dimethylether"), triethyleneglycol diethylether, etc.

Examples of dioxolanes include 1,3-dioxolane (DOX), 4,5-diethyl-dioxolane, 4,5-dimethyl-dioxolane, 4-methyl-1,3-dioxolane, and 4-ethyl-1,3-dioxolane.

Examples of carbonates for the organic solvent include methylene carbonate, ethylene carbonate, diethyl carbonate, dimethyl carbonate, γ-butyrolactone, propylene carbonate, methyl ethyl carbonate, vinylene carbonate, etc.

The organic electrolytic solution according to the present invention is useful for any common lithium battery, including primary and secondary batteries, especially having a lithium metal anode.

For application to lithium sulfur batteries having a cathode, which may be formed using a sulfur or a sulfur-containing compound, an organic electrolytic solution containing an oxalate compound of formula (1) above according to the present invention is prepared based on an organic solvent containing a polyglyme, a dioxolane, and further at least one selected from the group consisting of sulfolane, dimethoxyethane, and diethoxyethane.

This organic solvent contains a polyglyme in an amount of 30-60% by volume, a dioxolane in an amount of 20-60% by weight, and a balance of an organic solvent selected from sulfolane, dimethoxyethane, and diethoxyethane, based on the total volume of the organic solvent. It is preferable that the organic solvent contains a polyglyme and a dioxolane in a ratio of 1:9-9:1 by volume. If the amount of the dioxolane exceeds this range, discharging capacity and charging/discharging cycle life degrade.

For application of lithium batteries having a lithium composite oxide cathode, an organic electrolytic solution according to the present invention is prepared based on an organic solvent containing at least one of carbonates, 2-fluorobenzene, 3-fluorobenzene, 4-fluorobenzene, dimethoxyethane, diethoxyethane, and sulfolane.

Any lithium salt which is commonly used for lithium batteries is available for an organic electrolytic solution according to the present invention. Examples of a lithium salt include lithium perchlorate (LiClO$_4$), lithium tetrafluoroborate (LiBF$_4$), lithium hexafluorophosphate (LiPF$_6$), lithium trifluoromethansulfonate (LiCF$_3$SO$_3$), and lithium bistrifluoromethansulfonylamide (LiN(CF$_3$SO$_2$)$_2$). It is preferable that the concentration of lithium salt is in a range of 0.5-2.0M. If the concentration of lithium salt is less than 0.5M, ionic conductivity is low. If the concentration of lithium salt exceeds 2.0M, undesirably the lithium salt is more likely to decompose.

Examples of an unsubstituted $C_1$-$C_{20}$ alkyl group as a substitutent for $R_1$ and $R_2$ in formula (1) above include a methyl group, an ethyl group, a propyl group, an isobutyl group, a sec-butyl group, a pentyl group, an iso-amyl group, a hexyl group, etc., wherein at least one hydrogen atom of the alkyl group may be substituted with halogen atom, a hydroxy group, a nitro group, a cyano group, an amino group, an amidino group, hydrazine, hydrazone, a carboxy group, a sulfonic acid group, a phosphoric acid group, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

Examples of an unsubstituted $C_1$-$C_{20}$ alkoxy group as a substitutent for $R_1$ and $R_2$ in formula (1) above include a methoxy group, an ethoxy group, a propoxy group, an isobutyl group, a sec-butyloxy group, a pentyloxy group, an iso-amyloxy group, a hexyloxy group, etc, wherein at least one hydrogen atom of the alkoxy group can be substituted with any substitutent described above as being suitable for the $C_1$-$C_{20}$ alkyl group.

The aryl group as a substitutent for $R_1$ and $R_2$ in formula (1) above means a $C_6$-$C_{30}$ carbocyclic aromatic system containing at least one ring wherein such rings may be attached together in a pendent manner or may be fused. The term "aryl" embraces aromatic radicals, such as phenyl, naphthyl, tetrahydronaphthyl, etc. The aryl group may have a substitutent such as haloalkyl, nitro, cyano, alkoxy, and lower alkylamino. At least one hydrogen atom of the aryl group can be substituted with any substitutent described above as being suitable for the $C_1$-$C_{20}$ alkyl group.

The arylalkyl group as a substitutent for $R_1$ and $R_2$ in formula (1) above means the above-defined aryl group having lower alkyl substitutents, for example, methyl, ethyl, propyl, etc. for some hydrogen atoms. Examples of an arylalkyl group include benzyl, phenylethyl, etc. At least one hydrogen atom of the arylalkyl group can be substituted with any substitutent described above as being suitable for the $C_1$-$C_{20}$ alkyl group.

Examples of an aryloxy group as a substitutent for $R_1$ and $R_2$ in formula (1) above include a phenyloxy group, a naphthyloxy group, a tetrahydronaphthyloxy group, etc. At least one hydrogen atom of the aryloxy group can be substituted with any substitutent described above as being suitable for the $C_1$-$C_{20}$ alkyl group.

The heteroaryl group as a substitutent for $R_1$ and $R_2$ in formula (1) above means a $C_2$-$C_{30}$ monocyclic system containing one, two, or three hetero atoms selected from the group consisting of N, O, P, and S and having at least one ring wherein such rings may be attached together in a pendent manner or may be fused. At least one hydrogen atom of the heteroaryl group can be substituted with any substitutent described above as being suitable for the $C_1$-$C_{20}$ alkyl group.

The heteroarylalkyl group as a substitutent for $R_1$ and $R_2$ in formula (1) above means the above-defined heteroaryl group having lower alkyl substitute groups for some hydrogen atoms, wherein at least one hydrogen atom of the heteroarylalkyl group can be substituted with any substitutent described above as being suitable for the $C_1$-$C_{20}$ alkyl group.

The cycloalkyl group as a substitutent for $R_1$ and $R_2$ in formula (1) above means a $C_4$-$C_{30}$ monovalent monocyclic system, wherein at least one hydrogen atom of the cycloalkyl group can be substituted with any substitutent described above as being suitable for the $C_1$-$C_{20}$ alkyl group.

The heterocycloalkyl group as a substitutent for $R_1$ and $R_2$ in formula (1) above means a $C_1$-$C_{30}$ monovalent monocyclic system containing one, two, or three hetero atoms selected from the group consisting of N, O, P, and S and having lower alkyl groups for some hydrogen atoms, wherein at least one hydrogen atom of the heterocycloalkyl group can be substituted with any substitutent described above as being suitable for the $C_1$-$C_{20}$ alkyl group.

Hereinafter, a method of manufacturing a lithium secondary battery according to an embodiment of the present invention will be described.

First, a cathode and an anode are manufactured using a common method applied to produce lithium batteries. A lithium metal composite oxide, such as LiCoO$_2$ and LiMn$_2$O$_3$, is used as a cathode active material. A lithium metal electrode or a carbonaceous or graphite electrode is used for the anode.

Next, a separator is interposed between the cathode and the anode and subjected to rolling or the stacking of more electrodes and separators, to form an electrode assembly. The resulting electrode assembly is sealed in a battery case.

Next, an organic electrolytic solution according to the present invention is injected into the battery case containing the electrode assembly, so that a complete lithium secondary battery is obtained.

The organic electrolytic solution according to the present invention can be applied to lithium polymer secondary batteries, which use a polymer electrolyte, as well as such a lithium ion secondary battery described above. The organic electrolytic solution according to the present invention can be applied to lithium sulfur batteries.

Hereinafter, a method of manufacturing a lithium sulfur battery according to an embodiment of the present invention will be described. A method of manufacturing a lithium sulfur battery is similar to the above-described method of manufacturing a lithium secondary battery, with the exception of the material for the cathode. In a certain case, a protective layer may be further interposed between the anode and the separator so as to suppress the reaction of lithium with the electrolytic solution.

At least one selected from the group consisting of simple substance sulfur, kasolite containing $Li_2S_n$ where $n \geq 1$, organo-sulfur, and $(C_2S_x)_y$ where x ranges from 2.5 to 20 and $y \geq 2$ is used as a material for the cathode. It is preferable that the anode is formed as a lithium metal electrode, a lithium-metal alloy electrode made of, for example, lithium-aluminum, lithium-magnesium or lithium-silicon, or a lithium-inert sulfur composite electrode.

The present invention will be described in greater detail with reference to the following examples. The following examples are for illustrative purposes and are not intended to limit the scope of the invention.

To measure the charging/discharging efficiency of a lithium battery containing an organic electrolytic solution according to the present invention, 2016 type half coin batteries were manufactured in Examples 1 through 13, and full lithium sulfur batteries were manufactured in Examples 14 through 19.

EXAMPLE 1

An electrode assembly including a cathode, an anode, and a polyethylene separator (Ashai Co.) between the cathode and the anode was manufactured, wherein lithium metal electrodes were used for the cathode and the anode.

The electrode assembly was sealed in a battery case, and an organic electrolytic solution according to the present invention was injected to provide a complete lithium battery.

The organic electrolytic solution contained 1M $LiCF_3SO_3$ as a lithium salt, a mixture of 1,3-dioxane (DOX), diglyme (DGM), dimethoxyethane (DME), and sulfolane (SUL) in a ratio of 50:20:20:10 by volume as an organic solvent, and 0.05 parts by weight of dimethyl oxalate with respect to 100 parts by weight of the organic solvent.

EXAMPLES 2 THROUGH 4

Lithium batteries were manufactured in the same manner as in Example 1, except that the amount of dimethyl oxalate was varied to 0.1 parts by weight, 0.25 parts by weight, and 0.5 parts by weight for the respective lithium batteries.

EXAMPLE 5

A lithium battery was manufactured in the same manner as in Example 2, except that 0.1 parts by weight of diethyl oxalate was used instead of 0.1 parts by weight of dimethyl oxalate.

EXAMPLES 6 AND 7

Lithium batteries were manufactured in the same manner as in Example 5, except that the amount of diethyl oxalate was varied to 0.25 parts by weight and 0.5 parts by weight for the respective lithium batteries.

EXAMPLE 8

A lithium battery was manufactured in the same manner as in Example 2, except that 0.1 parts by weight of dibutyl oxalate was used instead of 0.1 parts by weight of dimethyl oxalate.

EXAMPLES 9 AND 10

Lithium batteries were manufactured in the same manner as in Example 8, except that the amount of dibutyl oxalate was varied to 0.25 parts by weight and 0.5 parts by weight for the respective lithium batteries.

EXAMPLE 11

A lithium battery was manufactured in the same manner as in Example 2, except that 0.1 parts by weight of bis(4-methylbenzyl) oxalate was used instead of 0.1 parts by weight of dimethyl oxalate.

EXAMPLES 12 AND 13

Lithium batteries were manufactured in the same manner as in Example 11, except that the amount of bis(4-methylbenzyl) oxalate was varied to 0.25 parts by weight and 0.5 parts by weight for the respective lithium batteries.

EXAMPLE 14

A cathode active material composition was prepared by mixing 70 parts by weight of sulfur, 10 parts by weight of Ketjen black as a carbon source, and 20 parts by weight of polyethyleneoxide in acetonitrile.

A carbon-coated aluminum (Al) substrate was coated with the cathode active material composition and dried to form a cathode. A lithium metal electrode was used as an anode.

An electrode assembly including the cathode, a polyethylene separator, and the anode stacked upon one another was manufactured and sealed in a battery case. An organic electrolytic solution was injected into the battery case to provide a complete lithium sulfur battery.

The organic electrolytic solution contained 1M $LiCF_3SO_3$ as a lithium salt, a mixture of DOX, DGM, DME, and SUL in a ratio of 50:20:20:10 by volume as an organic solvent, and 0.5 part by weight of dimethyl oxalate with respect to 100 parts by weight of the organic solvent.

EXAMPLE 15

A lithium sulfur battery was manufactured in the same manner as in Example 14, except that diethyl oxalate instead of dimethyl oxalate was used for the organic electrolytic solution.

EXAMPLE 16

A lithium sulfur battery was manufactured in the same manner as in Example 14, except that dibutyl oxalate instead of dimethyl oxalate was used for the organic electrolytic solution.

EXAMPLE 17

A lithium sulfur battery was manufactured in the same manner as in Example 14, except that bis(4-methylbenzyl) oxalate instead of dimethyl oxalate was used for the organic electrolytic solution.

EXAMPLE 18

A lithium sulfur battery was manufactured in the same manner as in Example 14, except that the amount of dimethyl oxalate was varied to 0.25 parts by weight.

EXAMPLE 19

A lithium sulfur battery was manufactured in the same manner as in Example 14, except that the amount of dimethyl oxalate was varied to 1 part by weight.

COMPARATIVE EXAMPLE 1

A lithium battery was manufactured in the same manner as in Example 1, except that only the mixture of DOX, DGM, DME, and SUL in a ratio of 50:20:20:10 by volume was used for the organic solvent, without the addition of dimethyl oxalate.

COMPARATIVE EXAMPLE 2

A lithium battery was manufactured in the same manner as in Comparative Example 1, except that a mixture of DGM, DME, and DOX in a ratio of 40:40:20 by volume was used for the organic solvent.

COMPARATIVE EXAMPLE 3

A lithium sulfur battery was manufactured in the same manner as in Example 14, except that only the mixture of DOX, DGM, DME, and SUL in a ratio of 50:20:20:10 by volume was used for the organic solvent, without the addition of dimethyl oxalate.

COMPARATIVE EXAMPLE 4

A lithium sulfur battery was manufactured in the same manner as in Comparative Example 3, except that a mixture of DGM, DME, and DOX in a ratio of 40:40:20 by volume was used for the organic solvent.

Figure 2:
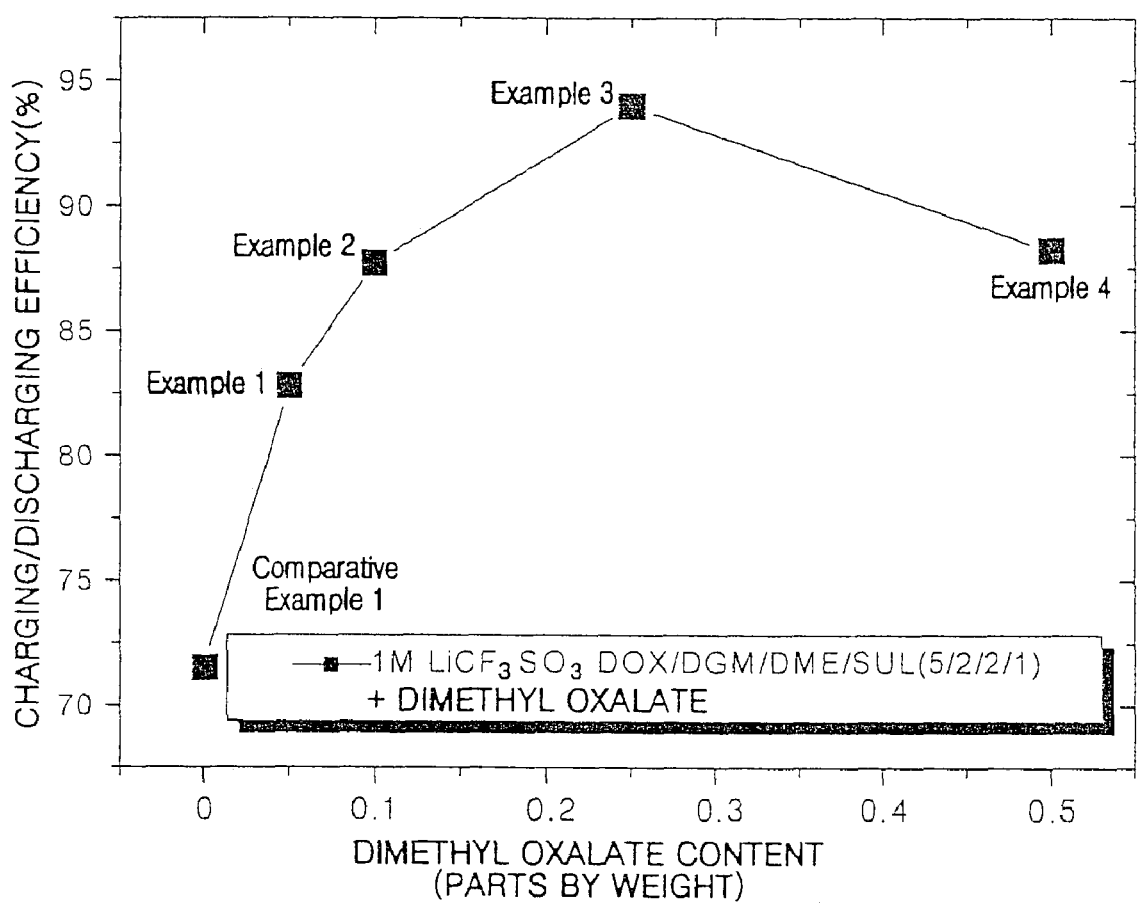
FIG. 2 is a graph illustrating change in charging/discharging efficiency with respect to dimethyl oxalate content for lithium batteries manufactured in Examples 1 through 4 according to the present invention and Comparative Example 1.

Change in charging/discharging efficiency with respect to dimethyl oxalate content was measured using the lithium batteries manufactured in Examples 1 through 4 and Comparative Example 1. The results are shown in FIG. 2. As is apparent from FIG. 2, the charging/discharging efficiency is improved for the lithium batteries of Examples 1 through 4, compared to the lithium battery of Comparative Example 1. The charging/discharging efficiency is greatest at about 0.25 parts by weight of dimethyl oxalate (Example 3).

Figure 3:
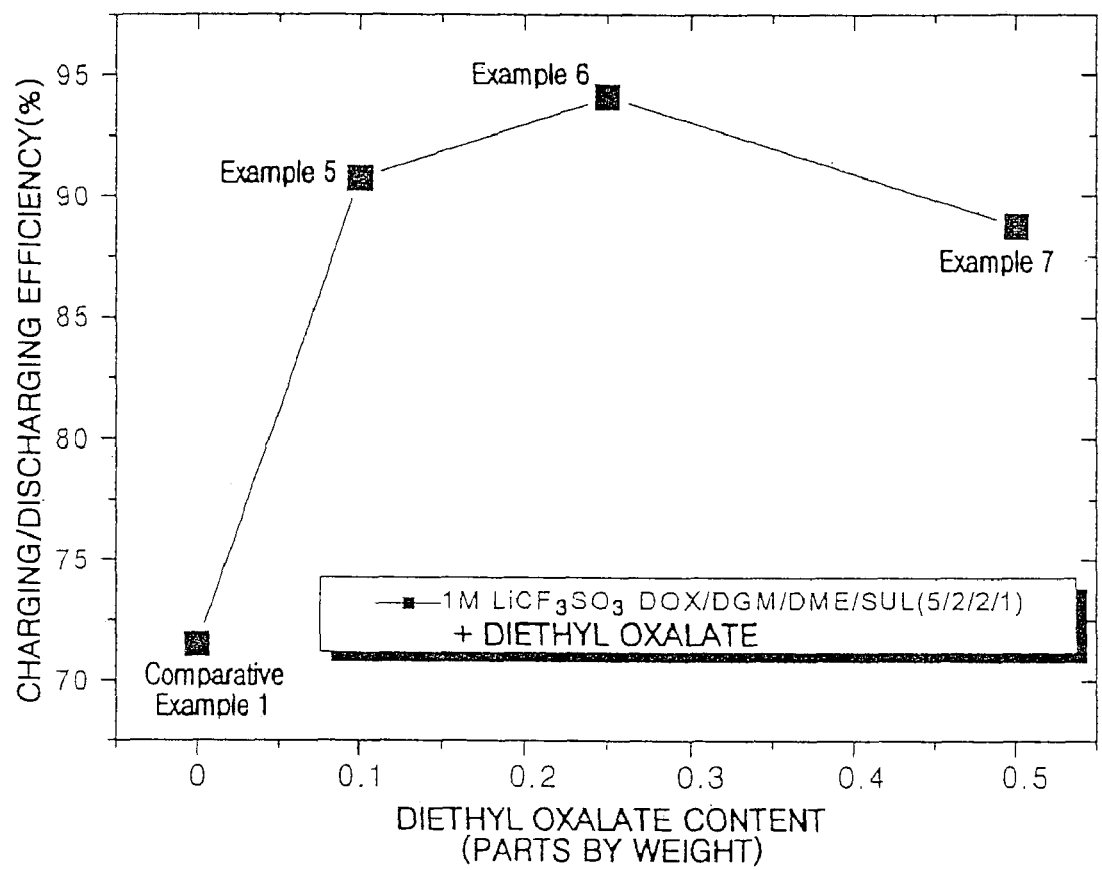
FIG. 3 is a graph illustrating change in charging/discharging efficiency with respect to diethyl oxalate content for lithium batteries manufactured in Examples 5 through 7 according to the present invention and Comparative Example 1.

Change in charging/discharging efficiency with respect to diethyl oxalate content was measured using the lithium batteries manufactured in Examples 5 through 7 and compared with Comparative Example 1. The results are shown in FIG. 3. As is apparent from FIG. 3, the charging/discharging efficiency is improved for the lithium batteries of Examples 5 through 7, compared to the lithium battery of Comparative Example 1. The charging/discharging efficiency is greatest at about 0.25 parts by weight of diethyl oxalate (Example 6).

Figure 4:
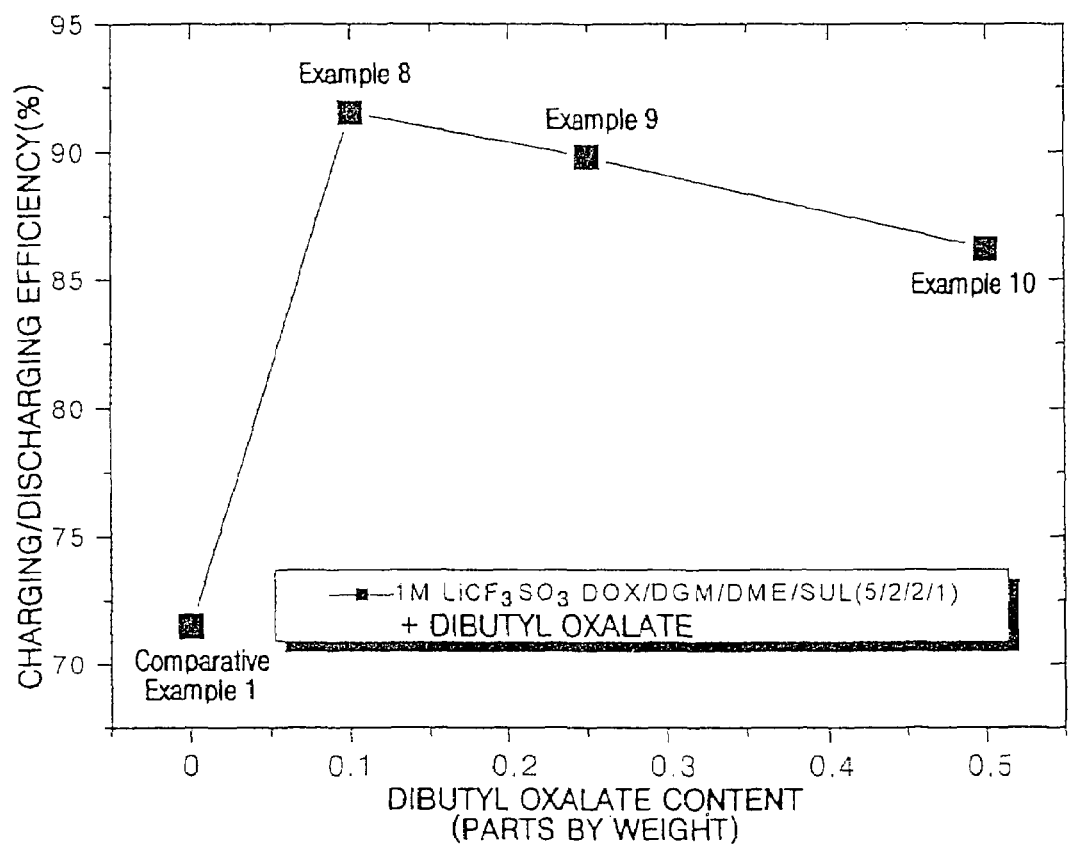
FIG. 4 is a graph illustrating change in charging/discharging efficiency with respect to dibutyl oxalate content for lithium batteries manufactured in Examples 8 through 10 according to the present invention and Comparative Example 1.

Change in charging/discharging efficiency with respect to dibutyl oxalate content was measured using the lithium batteries manufactured in Examples 8 through 10 and compared with Comparative Example 1. The results are shown in FIG. 4. As is apparent from FIG. 4, the charging/discharging efficiency is improved for the lithium batteries of Examples 8 through 10, compared to the lithium battery of Comparative Example 1. The charging/discharging efficiency is greatest at about 0.1 parts by weight of dibutyl oxalate (Example 8).

Figure 5:
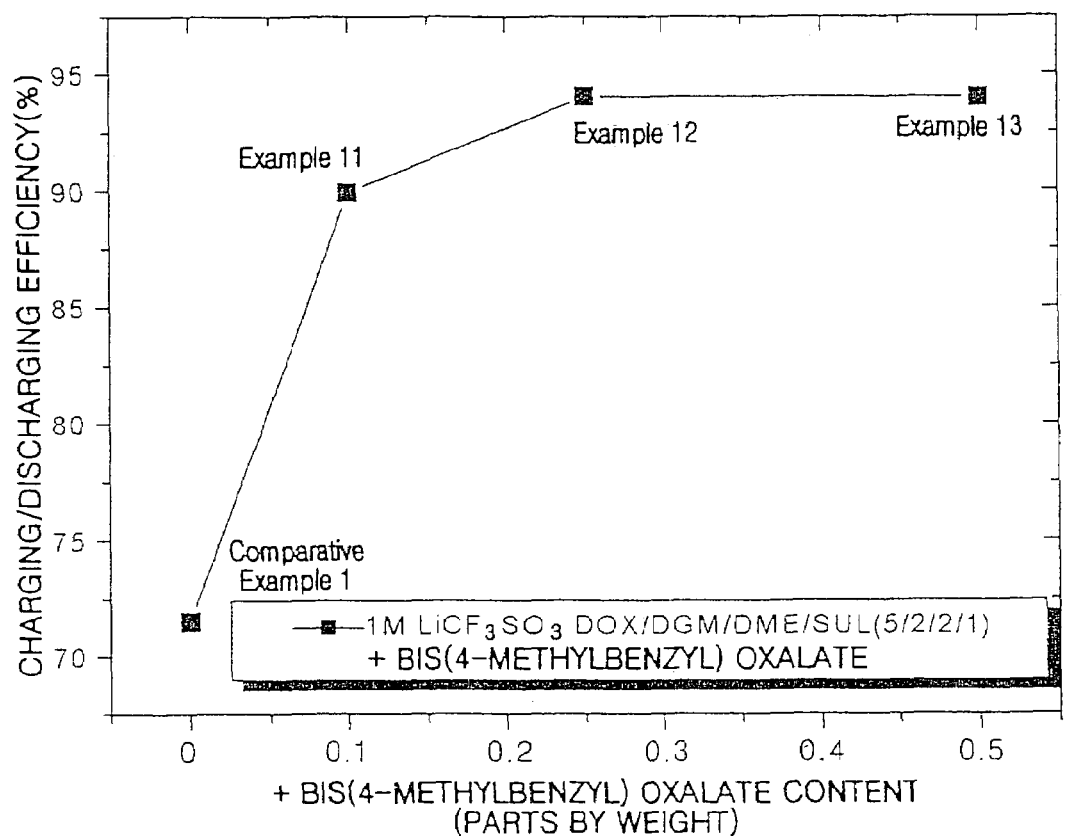
FIG. 5 is a graph illustrating change in charging/discharging efficiency with respect to bis(4-methylbenzyl) oxalate content for lithium batteries manufactured in Examples 11 through 13 according to the present invention and Comparative Example 1.

Change in charging/discharging efficiency with respect to bis(4-methylbenzyl) oxalate content was measured using the lithium batteries manufactured in Examples 11 through 13 and compared with Comparative Example 1. The results are shown in FIG. 5. As is apparent from FIG. 5, the charging/discharging efficiency is improved for the lithium batteries of Examples 11 through 13, compared to the lithium battery of Comparative Example 1. The charging/discharging efficiency is greater at about 0.25 parts by weight (Example 12) and about 0.5 parts by weight (Example 13) of bis(4-methylbenzyl) oxalate.

Figure 6:
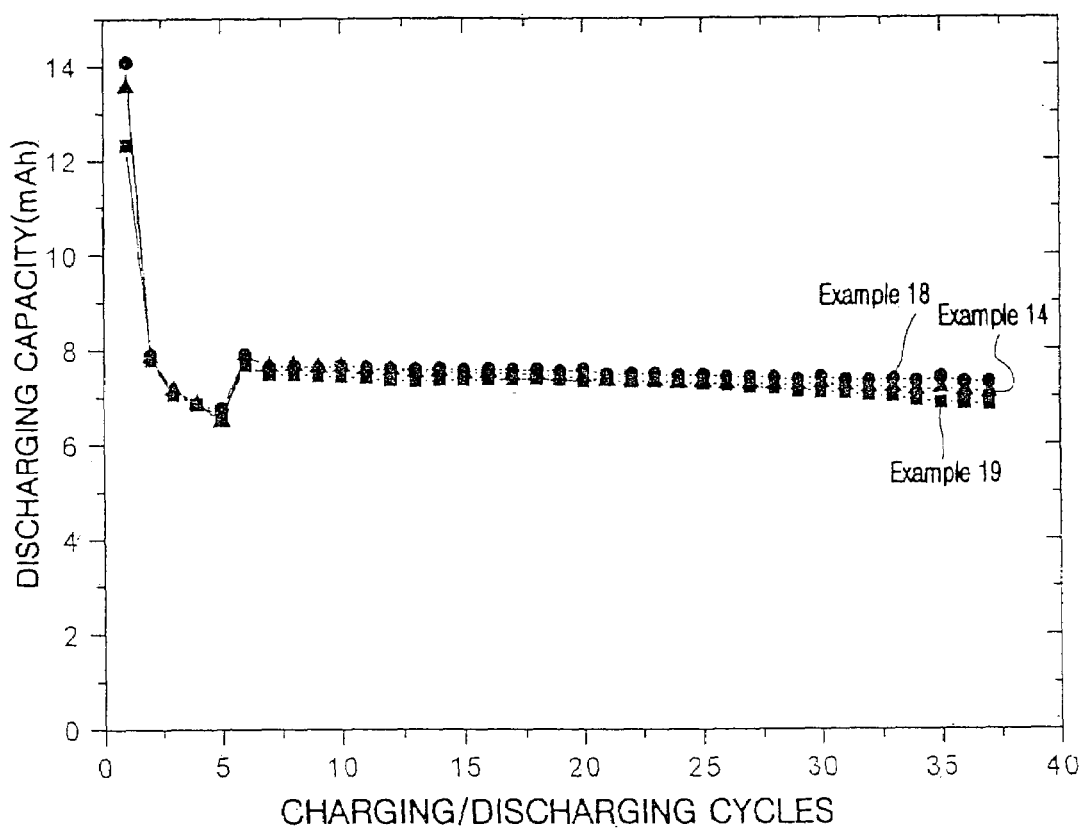
FIG. 6 is a graph illustrating change in discharging capacity with respect to the number of charging/discharging cycles for lithium sulfur batteries manufactured in Examples 14, 18, and 19 according to the present invention.

Change in discharging capacity with respect to the number of charging/discharging cycles was measured using the lithium sulfur batteries manufactured in Examples 14, 18 and 19 with varying amounts of dimethyl oxalate. The results are shown in FIG. 6. As is apparent from FIG. 6, the discharging capacity is excellent for all of the lithium sulfur batteries of Examples 14, 18, and 19 at similar levels.

Figure 7:
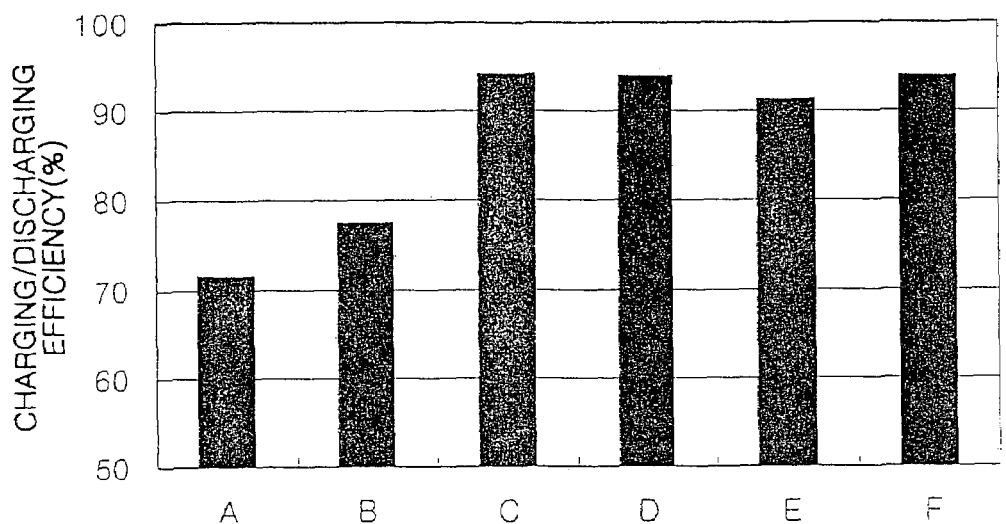
FIG. 7 is a bar graph illustrating charging/discharging efficiency for lithium sulfur batteries manufactured in Examples 14 through 17 according to the present invention and Comparative Examples 1 and 2.

Charging/discharging efficiency was measured using the lithium sulfur batteries manufactured in Examples 14 through 17 and Comparative Examples 1 and 2. The results are shown in FIG. 7. In FIG. 7, "A" denotes the case using the electrolytic solution of 1M $LiCF_3SO_3$ in the mixture of DOX, DGM, DME, and SUL in a ratio of 5:2:2:1 (Comparative Example 1), "B" denotes the case using the electrolytic solution of 1M $LiCF_3SO_3$ in the mixture of DGM, DME, and DOX in a ratio of 4:2:2 (Comparative Example 2), "C" denotes the case using the electrolytic solution of 1M $LiCF_3SO_3$ and dimethyl oxalate in the mixture of DOX, DGM, DME, and SUL in a ratio of 5:2:2:1 (Example 14), "D" denotes the case using the electrolytic solution of 1M $LiCF_3SO_3$ and diethyl oxide in the mixture of DOX, DGM, DME, and SUL in a ratio of 5:2:2:1 (Example 15), "E" denotes the case using the electrolytic solution of 1M $LiCF_3SO_3$ and dibutyl oxalate in the mixture of DOX, DGM, DME, and SUL in a ratio of 5:2:2:1 (Example 16), and "F" denotes the case using the electrolytic solution of 1M $LiCF_3SO_3$ and bis(4-methylbenzyl) oxalate in the mixture of DOX, DGM, DME, and SUL in a ratio of 5:2:2:1 (Example 17).

As is apparent from FIG. 7, the charging/discharging efficiency is improved for the lithium sulfur batteries of Examples 14 through 17, compared to Comparative Examples 1 and 2.

Figure 8:
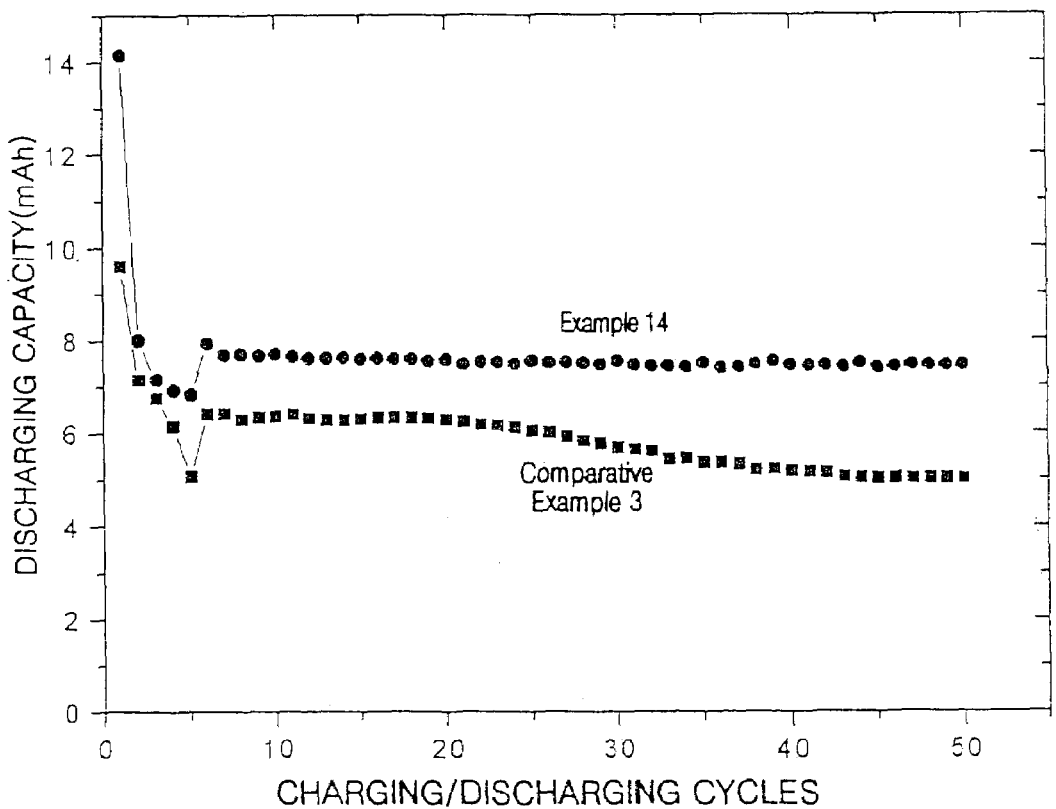
FIG. 8 is a graph illustrating change in discharging capacity with respect to the number of charging/discharging cycles for lithium sulfur batteries manufactured in Example 14 according to the present invention and Comparative Example 3.

Change in discharging capacity with respect to the number of charging/discharging cycles was measured using the lithium sulfur batteries manufactured in Example 14 and Comparative Example 3. The results are shown in FIG. 8. As is apparent from FIG. 8, the discharging capacity is improved for the lithium sulfur battery of Example 14, compared to Comparative Example 3.

An organic electrolytic solution according to the present invention contains an oxalate compound of formula (1) above and thus stabilizes lithium metal and improves the conductivity of lithium ions. The organic electrolytic solution according to the present invention improves charging/discharging efficiency when used in lithium batteries having a lithium metal anode.

Especially when the organic electrolytic solution is used in lithium sulfur batteries, the oxalate compound forms a chelate with lithium ions and improves the ionic conductivity and the charging/discharging efficiency of the battery. In addition, due to the chelation of the lithium ions, negative sulfur ions remain free without interaction with lithium ions, are highly likely to dissolve in the electrolytic solution. As a result, a reversible capacity of sulfur is increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lithium sulfur battery comprising:
   a cathode;
   an anode;
   a separator interposed between the cathode and the anode; and
   an organic electrolytic solution comprising:
   a lithium salt;
   an organic solvent; and
   an oxalate compound of formula (1) below:

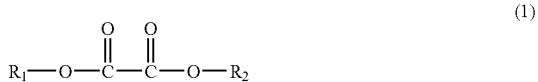

(1)

where $R_1$ and $R_2$ are independently selected from hydrogen atom, halogen atom, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ arylalkyl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroarylalkyl group, a substituted or unsubstituted $C_2$-$C_{30}$ heteroaryloxy group, a substituted or unsubstituted $C_5$-$C_{20}$ cycloalkyl group, and a substituted or unsubstituted $C_2$-$C_{20}$ heterocycloalkyl group, wherein the amount of the oxalate compound of said formula (1) is in a range of 0.001-10 parts by weight with respect to 100 parts by weight of the organic solvent, and wherein during use in said lithium sulfur battery said oxalate compound of formula (1) chelates with lithium ions and bonding between lithium ions and sulfide anions is blocked so that the solubility of sulfide ions is improved.

2. The lithium sulfur battery according to claim 1, wherein the oxalate compound of said formula (1) of said organic electrolytic solution is selected from the group consisting of diethyl oxalate, dimethyl oxalate, dipropyl oxalate, dibutyl oxalate, and bis-(4-methylbenzyl) oxalate.

3. The lithium sulfur battery according to claim 1, wherein the organic solvent of said organic electrolytic solution is at least one selected from the group consisting of a polyglyme, a dioxolane, a carbonate, 2-fluorobenzene, 3-fluorobenzene, 4-fluorobenzene, dimethoxyethane, diethoxyethane, and sulfolane.

4. The lithium sulfur battery according to claim 3, wherein the organic solvent of said organic electrolytic solution comprises a polyglyme selected from the group consisting of diethyleneglycol dimethylether ($CH_3(OCH_2CH_2)_2OCH_3$), diethyleneglycol diethylether ($C_2H_5(OCH_2CH_2)_2OC_2H_5$), triethyleneglycol dimethylether ($CH_3(OCH_2CH_2)_3OCH_3$), and triethyleneglycol diethylether ($C_2H_5(OCH_2CH2)_3OC_2H_5$).

5. The lithium sulfur battery according to claim 3, wherein the organic solvent of said organic electrolytic solution comprises a dioxolane, which is at least one selected from the group consisting of include 1,3-dioxolane, 4,5-diethyl-dioxolane, 4,5-dimethyl-dioxolane, 4-methyl-1,3-dioxolane, and 4-ethyl-1,3-dioxolane.

6. The lithium sulfur battery according to claim 3, wherein the organic solvent of said organic electrolytic solution is a mixture of the polyglyme and the dioxolane in a ratio of 1:9-9:1 by volume.

7. The lithium sulfur battery according to claim 3, wherein the organic solvent of said organic electrolytic solution comprises a carbonate, which is at least two selected from the group consisting of ethylene carbonate, methylene carbonate, diethyl carbonate, dimethyl carbonate, γ-butyrolactone, propylene carbonate, methyl ethyl carbonate, and vinylene carbonate.

8. The lithium sulfur battery according to claim 1, wherein the organic solvent of said organic electrolytic solution is at least one of a polyglyme and a dioxolane.

9. The lithium sulfur battery according to claim 8, wherein said polyglyme of the organic solvent of said organic electrolytic solution is selected from the group consisting of diethyleneglycol dimethylether ($CH_3(OCH_2CH_2)_2OCH_3$), diethyleneglycol diethylether ($C_2H_5(OCH_2CH_2)_2OC_2H_5$), triethyleneglycol dimethylether ($CH_3(OCH_2CH_2)_3OCH_3$), and triethyleneglycol diethylether ($C_2H_5(OCH_2CH_2)_3OC_2H_5$).

10. The lithium sulfur battery according to claim 8, wherein the dioxolane of said organic solvent of said organic electrolytic solution is at least two selected from the group consisting of include 1,3-dioxolane, 4,5-diethyl-dioxolane, 4,5-dimethyl-dioxolane, 4-methyl-1,3-dioxolane, and 4-ethyl-1,3-dioxolane.

11. The lithium sulfur battery according to claim 8, wherein said organic solvent of said organic electrolytic solution further comprises at least one selected from the group consisting of sulfolane, dimethoxyethane, and diethoxyethane.

12. The lithium sulfur battery according to claim 1, wherein said organic solvent of said organic electrolytic solution is at least one selected from the group consisting of a carbonate, 2-fluorobenzene, 3-fluorobenzene, 4-fluorobenzene, dimethoxyethane, diethoxyethane, and sulfolane.

13. The lithium sulfur battery according to claim 12, wherein said organic solvent of said organic elotrolytic solution comprises a carbonate, which is at least one selected from the group consisting of ethylene carbonate, methylene carbonate, diethyl carbonate, dimethyl carbonate, γ-butyrolactone, propylene carbonate, methyl ethyl carbonate, and vinylene carbonate.

14. The lithium sulfur battery according to claim 1, wherein said lithium salt has a concentration of 0.5-2.0M.

15. The lithium sulfur battery of claim 1, wherein the cathode is formed of at least one selected from the group consisting of a lithium composite oxide, simple substance sulfur, kasolite containing $Li_2S_n$ where n≧1, organo-sulfur, and $(C_2S_x)_y$ where x ranges from 2.5 to 20 and y≧2.

16. The lithium sulfur battery of claim 1, wherein the anode is formed as a lithium metal electrode, a lithium-metal alloy electrode, a lithium-inert sulfur composite electrode, a carbonaceous electrode, or a graphite electrode.

17. The lithium sulfur battery according to claim 1, wherein the oxalate compound of formula (1) is in the range of 0.05-1 part by weight with respect to 100 parts by weight of the organic solvent.

18. A lithium sulfur battery comprising:
a cathode;
an anode;
a separator interposed between the cathode and the anode; and
an organic electrolytic solution comprising:
a lithium salt;
an organic solvent; and
an oxalate compound of formula (1) below:

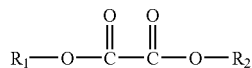

(1)

where $R_1$ and $R_2$ are independently selected from hydrogen atom, halogen atom, a hydroxy group, a substituted or unsubstituted C1-C20 alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ arylalkyl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroarylalkyl group, a substituted or unsubstituted $C_2$-$C_{30}$ heteroaryloxy group, a substituted or unsubstituted $C_5$-$C_{20}$ cycloalkyl group, and a substituted or unsubstituted $C_2$-$C_{20}$ heterocycloalkyl group, wherein the amount of the oxalate compound of said formula (1) is in a range of 0.001-10 parts by weight with respect to 100 parts by weight of the organic solvent, wherein during use in said lithium sulfur battery said oxalate compound of formula (1) chelates with lithium ions and bonding between lithium ions and sulfide anions is blocked so that the solubility of sulfides anions is improved, and wherein the oxalate compound of said formula (1) is selected from the group consisting of diethyl oxalate, dimethyl oxalate, dipropyl oxalate, dibutyl oxalate, and bis-(4-methylbenzyl) oxalate, and wherein the organic solvent is at least one selected from the group consisting of a polyglyme, a dioxolane, a carbonate, 2-fluorobenzene, 3-fluorobenzene, 4-fluorobenzene, dimethoxyethane, diethoxyethane, and sulfolane.

19. The lithium sulfur battery according to claim 18, wherein the organic solvent of the organic electrolytic solution comprises a polyglyme selected from the group consisting of diethyleneglycol dimethylether ($CH_3(OCH_2CH_2)_2OCH_3$), diethyleneglycol diethylether ($C_2H_5(OCH_2CH_2)_2OC_2H_5$), triethyleneglycol dimethylether ($CH_3(OCH_2CH_2)_3OCH_3$), and triethyleneglycol diethylether ($C_2H_5(OCH_2CH_2)_3OC_2H_5$), or wherein the organic solvent comprises a dioxolane, which is at least one selected from the group consisting of include 1,3-dioxolane, 4,5-diethyl-dioxolane, 4,5-dimethyl-dioxolane, 4-methyl-1,3-dioxolane, and 4-ethyl-1,3-dioxolane.

* * * * *